Patented July 12, 1932

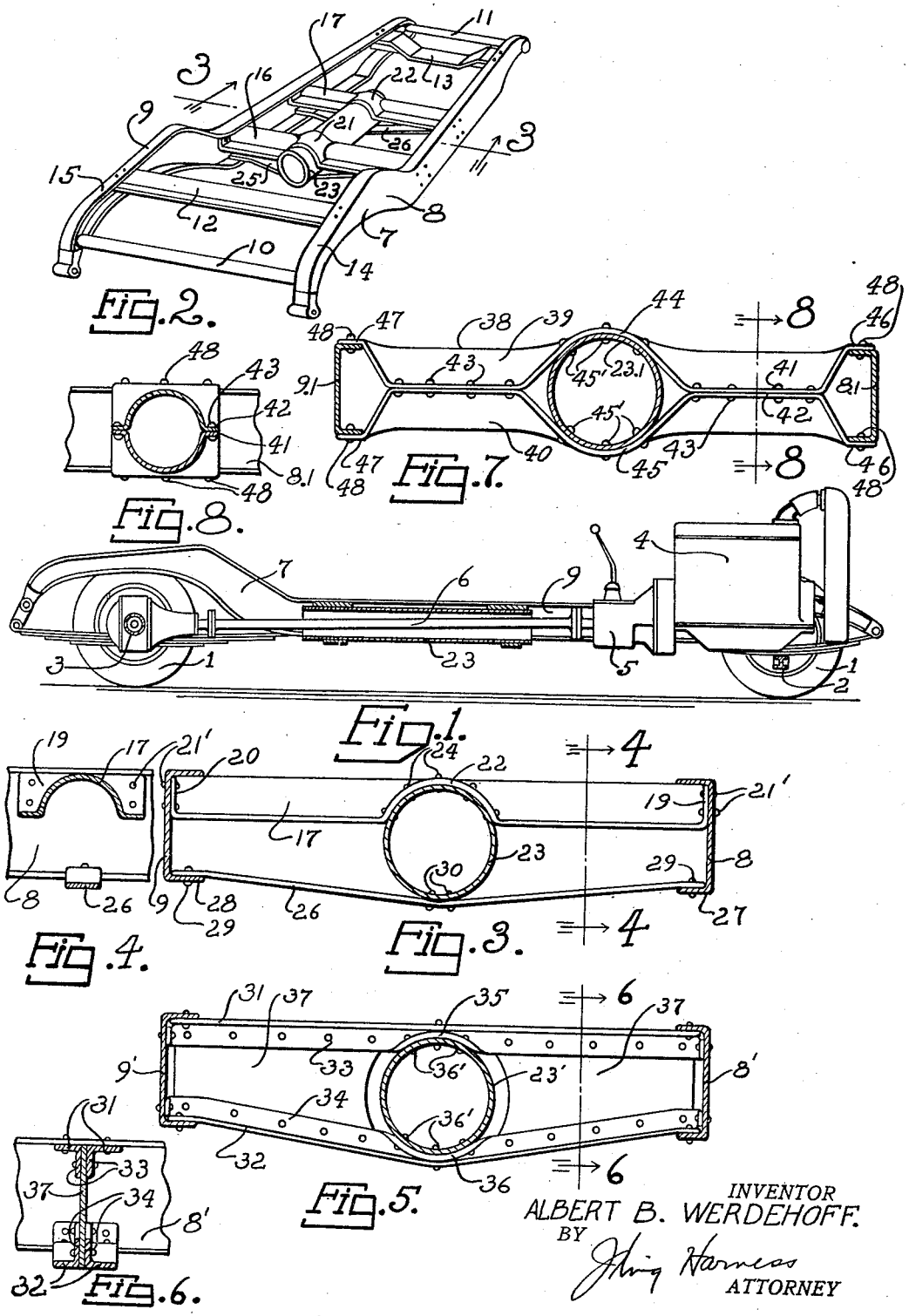

1,867,341

UNITED STATES PATENT OFFICE

ALBERT B. WERDEHOFF, OF ORION, MICHIGAN, ASSIGNOR TO CHRYSLER CORPORATION, OF DETROIT, MICHIGAN, A CORPORATION OF DELAWARE

CHASSIS FRAME CONSTRUCTION

Application filed January 29, 1930. Serial No. 424,355.

The main objects of this invention are to provide an improved chassis frame for vehicles; to provide improved means in a frame of this kind for resisting torsional distortion of one side of the frame relative to the other; to provide a tubular member for reinforcing a frame through which the drive shaft of a vehicle may extend so as to prevent addition of height to the body supporting parts of the frame by the reinforcing structure; to provide an improved arrangement of reinforcing means of this kind in a frame for permitting the employment of cross arms of substantially equal length between the reinforcing member and the respectively opposite sides of the frame; to provide improved transverse elements between the sides of a frame of this kind which will not materially reduce the road clearance of the chassis; and to provide a tubular backbone for a chassis frame for relieving the body which is normally supported thereon from distortion due to relative movement of the sides of the frame.

As illustrative embodiment of this invention is shown in the accompanying drawing, in which:

Fig. 1 is a longitudinal central section of a vehicle chassis having a frame which embodies my invention.

Fig. 2 is a perspective view of the frame.

Fig. 3 is a vertical section taken on line 3—3 of Fig. 2.

Fig. 4 is a vertical section taken on line 4—4 of Fig. 3.

Fig. 5 is a section similar to Fig. 3 showing a modified form of my invention.

Fig. 6 is a vertical section taken on the line 6—6 of Fig. 5.

Fig. 7 is a transverse section of a vehicle frame embodying another form of my invention.

Fig. 8 is a section taken on line 8—8 of Fig. 7.

In the form of my invention shown in Figs. 1, 2, 3, and 4, a vehicle chassis comprising wheels 1, front and rear axles 2 and 3, respectively, an engine 4, a transmission 5 and a drive shaft 6 has a frame 7 which includes spaced side members 8 and 9. The side members 8 and 9 are formed of channel bars, the channel sides of which are located on the inside of the frame. Rigidly mounted on the front and rear ends of the side members 8 and 9 are cross bars 10 and 11 respectively, the cleats 12 and 13 are provided between the side members and intermediate the bars 10 and 11. The cleats 12 and 13 are rigidly secured to the upper flanges 14 and 15 of the side members 8 and 9 respectively.

Extending transversely of the frame 7 substantially at the mid-portion thereof, are a pair of struts 16 and 17 having a substantially semi-cylindrical cross section as shown in Fig. 4. The ends of the struts have upright flanges 19 and 20 thereon which are riveted at 21' or secured by any suitable means to the side members 8 and 9 respectively.

Formed at the middle portions of the struts 16 and 17 are bowed sections 21 and 22 respectively, which have a substantially circular curvature. A reinforcing rib or stiffener 23 comprising a tubular member having a curvature which conforms with the bowed portions 21 and 22 is rigidly secured at its opposite ends to the bowed portions by rivets 24. Cross bars 25 and 26 are secured at their opposite ends to the lower flanges 27 and 28 of the side members 8 and 9 respectively, by rivets 29 and are located directly below the struts 16 and 17. These cross bars are rigidly attached at their middle portions to the tubular stiffener 23 by rivets 30. The drive shaft 6 extends axially through the tubular stiffener 23.

In the form of my invention shown in Figs. 5 and 6, the side members 8' and 9' are rigidly connected together by upper and lower pairs of angle bars 31 and 32. The vertical sides 33 and 34 of the angle bars are formed at 35 and 36 to conform to the curvature of a tubular stiffener 23' which is secured to the sides of the bars by rivets 36'. The sides of each angle bar are rigidly secured by rivets or other suitable means to the webs and flanges of the side members 8' and 9'. Mounted between the vertical sides 33 and 34 of the angle bars 31 and 32 respectively, are a pair of gusset plates 37.

In Figs. 7 and 8, the tubular stiffener 23.1 is rigidly connected with the side members 8.1 and 9.1 by a tubular cross member or housing 38 which extends between the side members of the frame. With this form of my invention, a pair of tubular housings 38 is employed in place of the struts 25 and 26 of Figs. 1, 2, 3 and 4.

Each housing 38 comprises an upper and lower substantially semi-cylindrical section 39 and 40 having adjacent flanges 41 and 42 on their side edges which are secured together by rivets 43. The upper and lower sections 39 and 40 are provided at their mid-portions with oppositely bowed sections 44 and 45 having curvatures which conform with the curvature of the tubular stiffener 23.1. The stiffener extends through the space between these bowed portions and is rigidly secured to the latter portions by rivets 45'. Formed on the extremities of the sections 39 and 40 are flanges 46 and 47 which are secured by rivets 48 to the opposite flanges of the side members 8.1 and 9.1.

With each form of my invention, it is intended that the drive shafts of the chassis extend through the tubular stiffener so as to reinforce the chassis frame without adding to the height of the body supporting portions thereof. The stiffener does not extend below the crank case of the engine 4 and therefore does not reduce the road clearance of the vehicle.

When forces of unequal intensity are applied on the respectively opposite sides or ends of the frame, the stiffener torsionally resists distortion of one side relative to the other and relieves the body of the vehicle which is supported on the frame from resisting frequent twisting movements.

Although but one specific embodiment of this invention has herein been shown and described, it will be understood that various changes including the size, shape and arrangement of parts, may be made without departing from the spirit of my invention and it is not my intention to limit its scope other than by the terms of the appended claims.

I claim:

1. A frame comprising spaced side members, substantially vertically aligned brace elements extending between said side members each having an arcuate cross section, registering oppositely bowed portions in said elements, and a stiffener having a curvature conforming with said bowed portions rigidly secured thereto.

2. A frame including spaced side members, a brace extending between said side members having an arcuate section and having a transversely extending cylindrical segment intermediate its ends, a tubular rib having a curved portion seated in and conforming in shape with said cylindrical segment, and a transverse member extending between the side members of said frame substantially in vertical alignment with said brace having an intermediate portion secured to said rib on the side thereof opposite from the cylindrical segment of said brace.

3. A frame comprising spaced side members, spaced struts extending between said side members, each having an arcuate transverse cross section and including an intermediate curved portion having an axis of curvature substantially normal to the lengths of said struts, a tubular reinforcement having a curvature substantially the same as the intermediate curved portion of said struts and secured thereto, and a cross member secured at its ends to said side members and at its intermediate portion to said reinforcement.

4. A frame including spaced longitudinal side members, a pair of longitudinally spaced transverse members extending between said side members, each having an arcuate cross section and having registering cylindrical segments at their intermediate portions, said cylindrical segments having a common axis extending lengthwise of said frame, a tubular rib having its ends seated in and secured to the cylindrical segments of said braces, and a pair of transverse members fixed at their ends to the side members of said frame, each in substantially vertical alignment with one of said braces respectively and secured to said rib on the opposite side thereof from said cylindrical segments.

5. A frame including spaced side members, a pair of substantially cylindrical transverse members having registering longitudinal edge flanges, registering bowed sections at the intermediate portions of said members forming a cylindrical passage therethrough normal to the length of said members, means rigidly securing said flanges together on respectively opposite sides of said bowed sections, a tubular reinforcing element extending through said passage and rigidly secured to said bowed sections, and flanges on the extremities of said transverse members rigidly attached to said side members.

ALBERT B. WERDEHOFF.